US012654171B2

(12) United States Patent
Zhang et al.

(10) Patent No.: US 12,654,171 B2
(45) Date of Patent: Jun. 16, 2026

(54) REAGENT CONTAINER AND TISSUE PROCESSOR

(71) Applicant: LEICA BIOSYSTEMS NUSSLOCH GMBH, Nussloch (DE)

(72) Inventors: Jingtian Zhang, Shanghai (CN); HongJian Tao, Shanghai (CN); Yuanyuan Wang, Shanghai (CN); Changhong Wu, Shanghai (CN)

(73) Assignee: LEICA BIOSYSTEMS NUSSLOCH GMBH, Nussloch (DE)

( * ) Notice: Subject to any disclaimer, the term of this patent is extended or adjusted under 35 U.S.C. 154(b) by 828 days.

(21) Appl. No.: 17/915,773

(22) PCT Filed: May 29, 2020

(86) PCT No.: PCT/CN2020/093177

§ 371 (c)(1), (2) Date: Sep. 29, 2022

(87) PCT Pub. No.: WO2021/237653

PCT Pub. Date: Dec. 2, 2021

(65) Prior Publication Data

US 2023/0166262 A1 Jun. 1, 2023

(51) Int. Cl.
*B01L 3/00* (2006.01)

(52) U.S. Cl.
CPC .................................... *B01L 3/52* (2013.01)

(58) Field of Classification Search
CPC ................ B01L 3/52; B01L 2200/026; B01L 2200/085; B01L 2200/18; B01L 2300/0848; B01L 2300/087; G01N 1/31; B65D 23/00
See application file for complete search history.

(56) References Cited

U.S. PATENT DOCUMENTS

| | | |
|---|---|---|
| 3,251,514 A | 5/1966 | Speicher |
| 4,848,602 A | 7/1989 | Yoshimura et al. |

(Continued)

FOREIGN PATENT DOCUMENTS

| | | |
|---|---|---|
| CN | 201454549 U | 5/2010 |
| CN | 103041875 A | 4/2013 |

(Continued)

OTHER PUBLICATIONS

First Chinese Office Action for Chinese Patent Application No. 202080100114.7, dated Dec. 28, 2024, 16 pages.

(Continued)

*Primary Examiner* — Samuel P Siefke
(74) *Attorney, Agent, or Firm* — Kinney & Lange, P.A.

(57) ABSTRACT

A reagent container for a tissue processor includes a first body defining a cavity configured to contain reagent; and a second body attached to the first body, wherein the second body defines a reagent passage, a cistern room and an reagent port, the reagent passage is in communication with the cavity, the cistern room is provided between the reagent passage and the reagent port and in communication with the reagent passage and the reagent port; in a flowing direction towards the reagent port, the cistern room has a larger section area than a section area of the reagent passage. The reagent coming out of the reagent passage will significantly slow down in a short time and will not spill out of the reagent container through the reagent port, thereby improving anti-spilling performance of the reagent container during transportation or operation of the reagent container.

18 Claims, 3 Drawing Sheets

(56) References Cited

U.S. PATENT DOCUMENTS

| | | | |
|---|---|---|---|
| 5,071,039 | A | 12/1991 | Anglehart |
| 2002/0145012 | A1 | 10/2002 | Ho |
| 2003/0029884 | A1 | 2/2003 | Rau |
| 2010/0055777 | A1 | 3/2010 | Rapp et al. |
| 2010/0112624 | A1 | 5/2010 | Metzner et al. |
| 2010/0112625 | A1 | 5/2010 | Erben et al. |
| 2012/0321513 | A1 | 12/2012 | Nagai et al. |
| 2014/0252039 | A1 | 9/2014 | Jennings et al. |
| 2019/0063658 | A1 | 2/2019 | Jacksteit et al. |

FOREIGN PATENT DOCUMENTS

| | | | |
|---|---|---|---|
| CN | 203158390 | U | 8/2013 |
| CN | 108663255 | A | 10/2018 |
| CN | 109424814 | A | 3/2019 |
| GB | 2542757 | A | 4/2017 |
| JP | S60175034 | U | 11/1985 |
| JP | 2016008049 | A | 1/2016 |
| JP | 3211917 | U | 8/2017 |

OTHER PUBLICATIONS

Decision of Refusal for Japanese Patent Application No. 2022-572421, dated Aug. 6, 2024, 6 pages.
Extended European Search Report for European Patent Application No. 20938394.2, dated Feb. 2, 2024, 6 pages.
Notice of Reasons for Refusal for Japanese Patent Application No. 2022-572421, dated Mar. 6, 2021, 6 pages.
Cutaway Image of Leica Peloris S26 Reagent Container.

REAGENT CONTAINER AND TISSUE PROCESSOR

CROSS-REFERENCE TO RELATED APPLICATIONS

The present application is a national phase entry under 35 USC § 371 of International Application PCT/CN2020/093177, filed May 29, 2020, the entire disclosure of which is incorporated herein by reference.

FIELD

The present disclosure relates to a field of tissue processing technologies, and more particularly to a reagent container and a tissue processor.

BACKGROUND

In the related art, a reagent contained in a reagent container for a tissue processor usually will spill out of the reagent container during transportation or operation of the reagent container, such as pulling the reagent container out of the tissue processor, or pushing the reagent container into the tissue processor. The spilling of the reagent will pollute the environment in laboratories and hurt the operators, which is also a waste.

SUMMARY

Embodiments of the present disclosure seek to solve at least one of the problems existing in the related art to at least some extent.

According to a first aspect of the present disclosure, a reagent container is provided, which can prevent contained reagent from spilling out.

According to a second aspect of the present disclosure, a tissue processor including the above reagent container is provided.

The reagent container according to embodiments of the present disclosure includes a first body and a second body attached to the first body. The first body defines a cavity configured to contain a reagent. The second body defines a reagent passage, a cistern room and a reagent port. The reagent passage is in communication with the cavity, and the cistern room is provided between the reagent passage and the reagent port and in communication with the reagent passage and the reagent port. In a flowing direction towards the reagent port, the cistern room has a larger section area than a section area of the reagent passage.

In the reagent container according to embodiments of the present disclosure, the cistern room is provided between the reagent passage and the reagent port, and the cistern room has a larger section area than a section area of the reagent passage in the flowing direction towards the reagent port, the reagent coming out of the reagent passage will significantly slow down in a short time and will not spill out of the reagent container through the reagent port, thereby improving anti-spilling performance of the reagent container during transportation or operation of the reagent container.

In at least one embodiment of the present disclosure, the cistern room has a gradually increasing section area from bottom to top, thus facilitating improvement of anti-spilling performance of the reagent container.

In at least one embodiment of the present disclosure, the reagent port is arranged above a junction of the reagent passage and the cistern room, thus further improving the anti-spilling performance of the reagent container.

In at least one embodiment of the present disclosure, the reagent passage includes a straight segment extending in an up-down direction and a bent segment, the straight segment has a lower end in communication with the cavity and an upper end in communication with a lower end of the bent segment, and an upper end of the bent segment is in communication with the cistern room. Thus, a flowing distance of the reagent in the reagent passage can be extended, facilitating improvement of anti-spilling performance of the reagent container.

In at least one embodiment of the present disclosure, the straight segment and the bent segment have an identical section area along a centerline of the reagent passage. Thus, the flowing speed of the reagent in the reagent passage is substantially constant.

In at least one embodiment of the present disclosure, the cistern room has a vertical wall, a horizontal wall and an inclined wall, an upper end of the vertical wall is connected to a rear end of the horizontal wall, and the inclined wall is connected between a front end of the horizontal wall and a lower end of the vertical wall. Thus, the cistern room has a gradually increasing section area from bottom to top.

In at least one embodiment of the present disclosure, the bent segment is bent forward and connected to the cistern room at an intersection of the vertical wall and the inclined wall and tangent to the inclined wall. Thus, a flowing distance of the reagent in the cistern room may be extended.

In at least one embodiment of the present disclosure, the reagent port is connected to the vertical wall of the cistern room. Thus, the reagent port may be away from the inclined wall of the cistern room.

In at least one embodiment of the present disclosure, the reagent passage has a circular, a square, or a triangular section along a centerline thereof. Thus, the structure of the reagent passage may be diversified.

In at least one embodiment of the present disclosure, the cistern room has a circular, a square, or a triangular section along a left-right direction. Thus, the structure of the cistern room may be diversified.

In at least one embodiment of the present disclosure, the reagent container further includes a third body attached to the first body, and defining an air passage and an air port in communication with each other, the air passage being in communication with the cavity. Thus, the reagent container may be in communication with ambient air, and vacuum or pressure may be prevented from being formed in the reagent container, avoiding affecting normal flowing of the reagent in the reagent container.

In at least one embodiment of the present disclosure, the air passage extends in a front-rear direction, and has a front end in communication with the cavity and a rear end in communication with the air port. Thus, the ambient air can be smoothly introduced into or discharged from reagent container.

In at least one embodiment of the present disclosure, the air port is located above the reagent port. Thus, a compact structure of the reagent container can be realized.

In at least one embodiment of the present disclosure, the first body is further provided with a filling port. Thus, the filling of the reagent in the cavity of the first body can be facilitated.

In at least one embodiment of the present disclosure, the reagent container further includes a cap detachably fitted to the filling port of the first body. Thus, the cavity of the first body can be sealed by the cap.

The tissue processor according to embodiments of the present disclosure includes a reagent container according to any one of above embodiments; a platform, the reagent container being supported on the platform; and a reagent pipeline in communication with the reagent port of the reagent container.

In the tissue processor according to embodiments of the present disclosure, by employing the above reagent container, the reagent can be prevented from spilling out of the reagent container, and the tissue processor can be prevented from being contaminated.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

DETAILED DESCRIPTION

The embodiments of the present disclosure will be illustrated below with reference to the accompanying drawings. It should be noted that, as used herein, the terms such as “upper”, “lower”, “left”, “right”, “front”, “rear” and the like are only for the purpose of illustration and are not intended to limit the present disclosure.

A reagent container 100 according to embodiments of the present disclosure will be described in detail below with reference to FIGS. 1 to 5. The orthogonal XYZ-axis is illustrated in order to facilitate the description and determine the directions. In which, the positive direction of the X-axis is the front direction and the negative direction of the X-axis is the rear direction; the positive direction of the Y-axis is the right direction and the negative direction of the Y-axis is the left direction; the positive direction of the Z-axis is the up direction and the negative direction of the Z-axis down direction.

Figure 1:
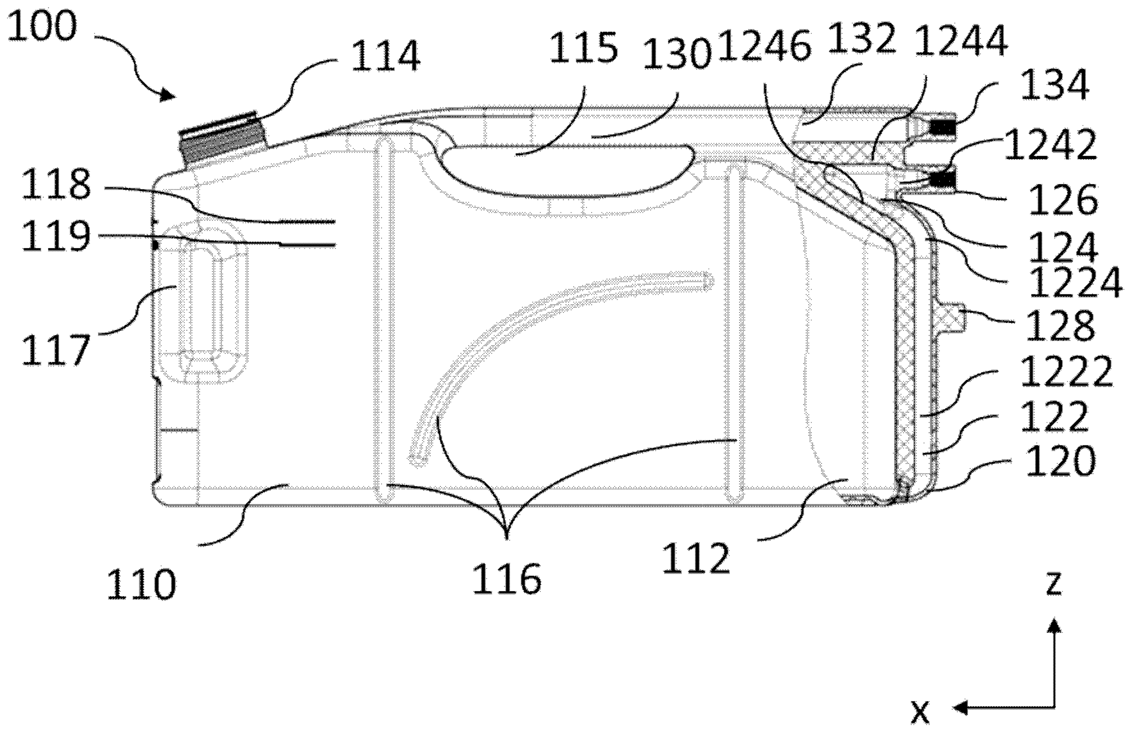
FIG. 1 is a partially cutaway left view of a reagent container according to an embodiment of the present disclosure.

In some embodiments, as illustrated in FIG. 1, the reagent container 100 according to embodiments of the present disclosure includes a first body 110 and a second body 120 attached to the first body 110. The first body 110 defines a cavity 112 configured to contain reagent. The second body 120 defines a reagent passage 122, a cistern room 124 and a reagent port 126. The reagent passage 122 is in communication with the cavity 112, and the cistern room 124 is provided between the reagent passage 122 and the reagent port 126 and in communication with the reagent passage 122 and the reagent port 126. In a flowing direction towards the reagent port 126, the cistern room 124 has a larger section area than a section area of the reagent passage 122.

It should be noted that, the section area of the cistern room 124 in the flowing direction towards the reagent port 126 refers to an area of a section of the cistern room 124 cut by a plane substantially perpendicular to the flowing direction towards the reagent port 126; and the section area of the reagent passage 122 in the flowing direction towards the reagent port 126 refers to an area of a section of the reagent passage 122 cut by a plane substantially perpendicular to the flowing direction towards the reagent port 126.

In the reagent container 100 according to embodiments of the present disclosure, the cistern room 124 is provided between the reagent passage 122 and the reagent port 126, and the cistern room 124 has a larger section area than a section area of the reagent passage 122 in the flowing direction towards the reagent port 126, the reagent coming out of the reagent passage 122 will significantly slow down in a short time and will not spill out of the reagent container 100 through the reagent port 126, thereby improving anti-spilling performance of the reagent container 100 during transportation or operation of the reagent container 100.

In some embodiments, as illustrated in FIG. 1, the cistern room 124 has a gradually increasing section area from bottom to top, thus facilitating improvement of anti-spilling performance of the reagent container 100.

It should be noted that the section area of the cistern room 124 from bottom to top refers to an area of a section of the cistern room 124 cut by a plane substantively perpendicular to an upper-down direction.

In some embodiments, as illustrated in FIG. 1, the reagent port 126 is arranged above a junction of the reagent passage 122 and the cistern room 124, thus further improving the anti-spilling performance of the reagent container 100.

In some embodiments, as illustrated in FIG. 1, the reagent passage 122 includes a straight segment 1222 extending in an up-down direction and a bent segment 1224, the straight segment 1222 has a lower end in communication with the cavity 112 and an upper end in communication with a lower end of the bent segment 1224, and an upper end of the bent segment 1224 is in communication with the cistern room 124. Thus, a flowing distance of the reagent in the reagent passage 122 can be extended, facilitating improvement of anti-spilling performance of the reagent container 100.

In some embodiments, as illustrated in FIG. 1, the straight segment 1222 and the bent segment 1224 have an identical section area along a centerline of the reagent passage 122. Thus, the flowing speed of the reagent in the reagent passage 122 is substantially constant.

It should be noted that the section area of the straight segment 1222 along the centerline of the reagent passage 122 refer to an area of a section of the straight segment 1222 cut by a plane substantially perpendicular to the centerline of the reagent passage 122; and the section area of the bent segment 1224 along the centerline of the reagent passage 122 refer to an area of a section of the bent segment 1224 cut by a plane substantially perpendicular to the centerline of the reagent passage 122.

In some embodiments, as illustrated in FIG. 1, the cistern room 124 has a vertical wall 1242, a horizontal wall 1244 and an inclined wall 1246, an upper end of the vertical wall 1242 is connected to a rear end of the horizontal wall 1244, and the inclined wall 1246 is connected between a front end of the horizontal wall 1244 and a lower end of the vertical wall 1242. Thus, the cistern room 124 has a gradually increasing section area from bottom to top.

In some embodiments, as illustrated in FIG. 1, the bent segment 1224 is bent forward and connected to the cistern room 124 at an intersection of the vertical wall 1242 and the inclined wall 1246 and tangent to the inclined wall 1246. Thus, a flowing distance of the reagent in the cistern room 124 may be extended.

In some embodiments, as illustrated in FIG. 1, the reagent port 126 is connected to the vertical wall 1242 of the cistern room 124. Thus, the reagent port 126 may be away from the inclined wall 1246 of the cistern room 124.

In some embodiments, the reagent passage 122 has a circular, a square, or a triangular section along a centerline thereof. Thus, the structure of the reagent passage 122 may be diversified.

It should be noted that the section of the reagent passage 122 along the centerline thereof refers to a section of the reagent passage 122 cut by a plane substantially perpendicular to the centerline of the reagent passage 122.

In some embodiments, the cistern room 124 has a circular, a square, or a triangular section along a left-right direction. Thus, the structure of the cistern room 124 may be diversified.

It should be noted that the section of the cistern room 124 along the left-right direction refers to a section of the cistern room 124 cut by a plane substantially perpendicular to the left-right direction.

Figure 2:
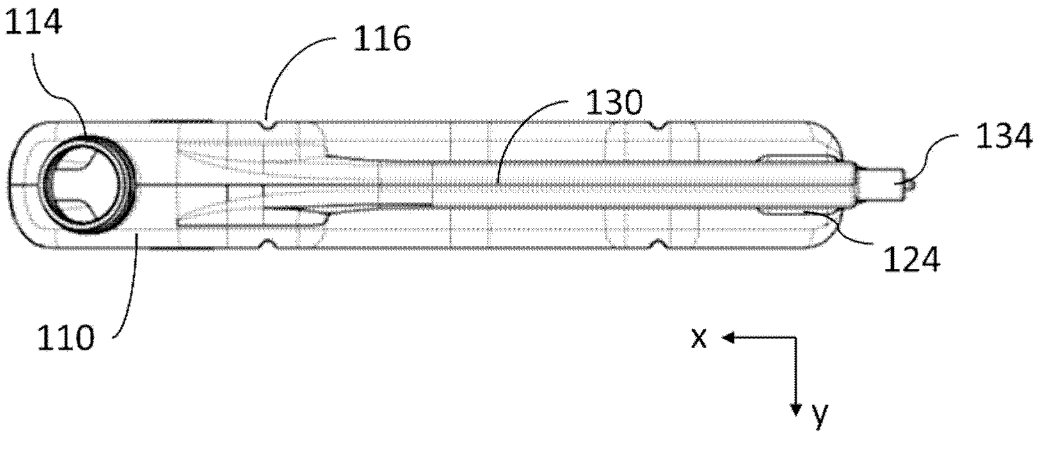
FIG. 2 is a plan view of a reagent container according to an embodiment of the present disclosure.

In some embodiments, as illustrated in FIGS. 1 and 2, the reagent container 100 further includes a third body 130 attached to the first body 110, and defining an air passage 132 and an air port 134 in communication with each other, the air passage 132 being in communication with the cavity 112. Thus, the reagent container 100 may be in communication with ambient air, and vacuum or pressure may be prevented from being formed in the reagent container 100, avoiding affecting normal flowing of the reagent in the reagent container 100.

In some embodiments, as illustrated in FIGS. 1 and 2, the air passage 132 extends in a front-rear direction, and has a front end in communication with the cavity 112 and a rear end in communication with the air port 134. Thus, the ambient air can be smoothly introduced into or discharged from reagent container 100.

In some embodiments, as illustrated in FIG. 1, the air port 134 is located above the reagent port 126. Thus, a compact structure of the reagent container 100 can be realized.

Figure 3:
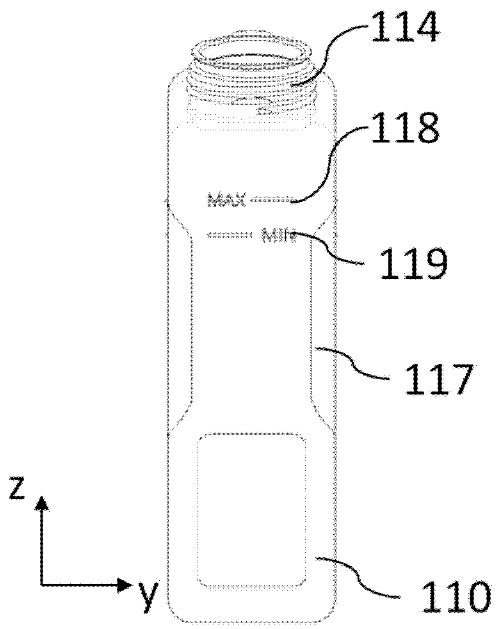
FIG. 3 is a front view of a reagent container according to an embodiment of the present disclosure without a cap.

In some embodiments, as illustrated in FIGS. 1, 2 and 3, the first body 110 is further provided with a filling port 114. Thus, the filling of the reagent in the cavity 112 of the first body 110 can be facilitated.

Figure 4:
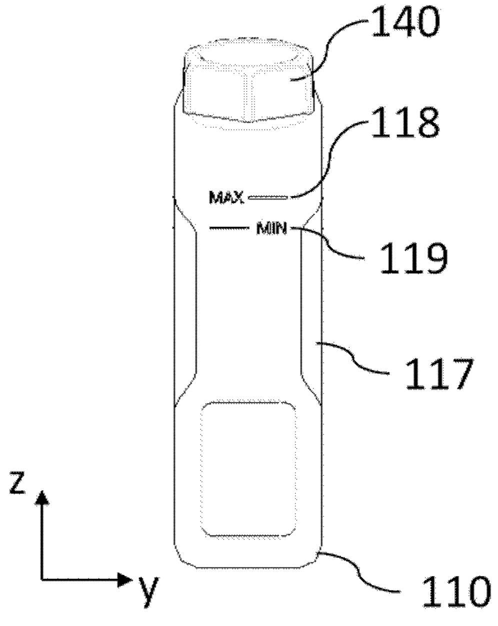
FIG. 4 is a front view of a reagent container according to an embodiment of the present disclosure with a cap.

In some embodiments, as illustrated in FIG. 4, the reagent container 100 further includes a cap 140 detachably fitted to the filling port 114 of the first body 110. Thus, the cavity 112 of the first body 110 can be sealed by the cap 140.

In some embodiments, as illustrated in FIG. 1, the first body 110 and the second body 120 may be formed into one piece. Thus, the compact structure of the reagent container 100 can be realized. In some other embodiments, the first body 110 and the second body 120 may be formed separately, and the second body 120 may be fixedly connected to the first body 110.

In some embodiments, as illustrated in FIGS. 1, 2 and 3, the filling port 114 is provided to an upper face of the reagent container 100 close to a front face of the first body 110, and an axis of the filling port 114 is inclined forwards, such that the cavity 112 of the first body 110 can be conveniently filled after the reagent container 100 is pushed into the tissue processor.

In some embodiments, as illustrated in FIG. 1, the first body 110 defines a recess 115 recessed downwards from an upper face of the first body 110, and located under the second body 120. Thus, the second body 120 can serve as a handle.

In some embodiments, as illustrated in FIGS. 1 and 2, the first body 110 further defines a plurality of dents 116, and each of the plurality of dents 116 is recessed from a left face or a right face of the first body 110. Thus, the structure of the first body 110 can be enhanced, and the first body 110 can be prevented from swelling.

In some embodiments, as illustrated in FIGS. 1, 3 and 4, the first body 110 further defines two grooves 117 in the left face and right face of the first body 110 symmetrically and adjacent to the front face of the first body 110. Thus, the two grooves 117 may serve as a grip for a user to hold the first body 110.

In some embodiments, as illustrated in FIGS. 1, 3 and 4, the first body 110 is further provided with a max line 118 and a min line 119 on each of the front face, the left face and the right face of the first body 110. The max line 118 is located above the min line 119, and the max line 118 is lower than the junction of the cistern room 124 and the reagent passage 122. Thus, the reagent can be filled in the reagent container 100 between the max line 118 and the min line 119 without affecting the anti-spilling performance of the reagent container 100.

Figure 5:
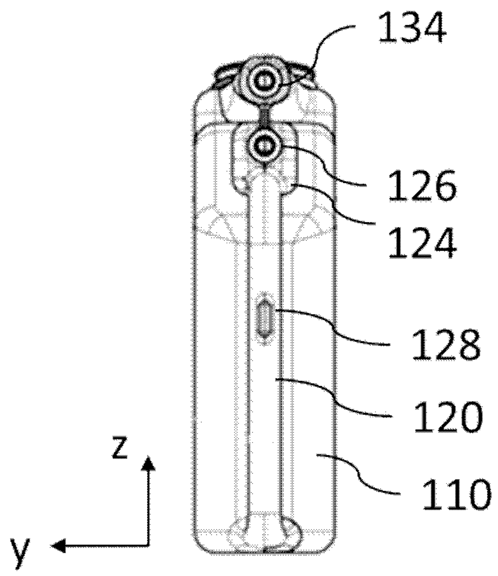
FIG. 5 is a rear view of a reagent container according to an embodiment of the present disclosure.

In some embodiments, as illustrated in FIG. 5, the second body 120 has a smaller size than a width of the first body 110 in the left-right direction. Thus, material for manufacturing the reagent container 100 can be saved.

In some embodiments, as illustrated in FIG. 2, the third body 130 has a smaller size than a width of the first body 110 in the left-right direction. Thus, material for manufacturing the reagent container 100 can be saved.

The tissue processor according to embodiments of the present disclosure includes a reagent container according to any one of above embodiments; a platform, the reagent container being supported on the platform; and a reagent pipeline in communication with the reagent port of the reagent container.

In the tissue processor according to embodiments of the present disclosure, by employing the above reagent container, the reagent can be prevented from spilling out of the reagent container, and the tissue processor can be prevented from being contaminated.

As illustrated in FIG. 1, according to at least one embodiment of the present disclosure, the reagent container 100 includes a first body 110, a second body 120 and a third body 130.

The first body 110 defines a cavity 112 configured to contain a reagent and a filling port 114 in communication with the cavity 112, and the reagent may be filled in the cavity 112 through the filling port 114. The filling port 114 is provided to an upper face of the first body 110 close to the front face of the first body 110, and an axis of the filling port 114 is inclined forwards.

The second body 120 is attached to a rear face of the first body 110, and the first body 110 and the second body 120 are formed into one piece. The second body 120 defines a reagent passage 122, a cistern room 124 and a reagent port 126.

The reagent passage 122 extends substantially in an up-down direction. The reagent passage 122 has a straight segment 1222 and a bent segment 1224. A lower end of the straight segment 1222 is in communication with the cavity 112 of the first body 110, an upper end of the straight segment 1222 is in communication with a lower end of the bent segment 1224, and an upper end of the bent segment

1224 is in communication with the cistern room 124. The reagent passage 122 has a circular section along a centerline of the reagent passage 122. The straight segment 1222 and the bent segment 1224 have substantially identical section area along the centerline of the reagent passage 122.

The cistern room 124 is connected between the reagent passage 122 and the reagent port 126 and in communication with the reagent passage 122 and the reagent port 126. The cistern room 124 has a gradually increasing section area from bottom to top. The cistern room 124 has a triangular section along a left-right direction. In the triangular section of the cistern room 124 along the left-right direction, the cistern room 124 has a vertical wall 1242, a horizontal wall 1244 and an inclined wall 1246. An upper end of the vertical wall 1242 is connected to a rear end of the horizontal wall 1244, and the inclined wall 1246 is connected between a front end of the horizontal wall 1244 and a lower end of the vertical wall 1242. That is, the inclined wall 1246 extends upwards from the rear to the front.

The bent segment 1224 is bent forward and connected to the cistern room 124 at an intersection of the vertical wall 1242 and the inclined wall 1246 and substantially tangent to the inclined wall 1246.

The reagent port 126 is connected to the vertical wall 1242 of the cistern room 124 and located above a junction between the reagent passage 122 and the cistern room 124. The reagent port 126 may be in communication with a reagent pipeline of a tissue processor. The second body 120 is provided with a protrusion 128 extending rearwards.

The third body 130 is attached to the upper face of the first body 110, and the first body 110 and the third body 130 are formed into one piece. The third body 130 is also attached to an upper end of the second body 120, and the second body 120 and the third body 130 are formed into one piece. That is, the first body 110, the second body 120 and the third body 130 are formed into one piece.

The third body 130 defines an air passage 132 and an air port 134 in communication with each other. The air passage 132 extends in a front-rear direction, having a front end in communication with the cavity 112 and a rear end in communication with the air port 134. The air port 134 may be in communication with an air pipeline of the tissue processor.

The first body 110 defines a recess 115. The recess 115 is recessed downwards from the upper face of the first body 110, and located under the second body 120. Thus, the second body 120 can serve as a handle.

As illustrated in FIGS. 1 and 2, the first body 110 is further provided with three dents 116 recessed from a right face of the first body 110, and other three dents 116 recessed from a left face of the first body 110. Two of the three dents 116 in the right face of the first body 110 extends vertically and spaced from each other in the front-rear direction. The rest one of the three dents 116 in the right face of the first body 110 is located between and spaced from the two of the three dents 116, and has a curved shape. The other three dents 116 in the left face of the first body 110 are arranged symmetrically with the three dents 116 in the right face of the first body 110.

As illustrated in FIGS. 1, 3 and 4, the first body 110 further defines two grooves 117 in the left face and the right face of the first body 110 symmetrically and adjacent to a front face of the first body 110. The two grooves 117 may serve as a grip for a user to hold the first body 110.

The first body 110 is further provided with a max line 118 and a min line 119 on each of the front face, the left face and the right face of the first body 110, and the max line 118 and the min line 119 on the left face or the right face of the first body 110 are located between the groove 117 and the dents 116 in the front-rear direction. The max line 118 is located above the min line 119, and the max line 118 is lower than the junction of the cistern room 124 and the reagent passage 122.

As illustrated in FIG. 5, the second body 120 has a smaller size than a width of the first body 110 in the left-right direction, and the second body 120 is attached to a middle of the rear face of the first body 110 in the left-right direction. As illustrated in FIG. 2, the third body 130 has a smaller size than the width of the first body 110 in the left-right direction, and the third body 130 is attached to a middle of the upper face of the first body 110 in the left-right direction.

As illustrated in FIG. 5, the cistern room 124 has a larger size than the size of the reagent passage 122 in the left-right direction. As illustrated in FIG. 2, the cistern room 124 has a larger size than the size of the third body 130 in the left-right direction.

As illustrated in FIG. 4, the reagent container 100 further includes a cap 140. The cap 140 is detachably fitted to the filling port 114 of the first body 110.

A tissue processor includes a platform, a clamping device, a detection unit, a reagent pipeline, an air pipeline and the reagent container 100 according to above embodiment.

The reagent container 100 is supported on the platform. The reagent pipeline is in communication with the reagent port 126 of the reagent container 100, and the air pipeline is in communication with the air port 134 of the reagent container 100.

The detection unit can detect a position of the protrusion 128 of the reagent container 100. When the reagent container 100 is put in place on the platform, the protrusion 128 of the reagent container 100 can be detected by the detection unit.

The clamping device is used to clamp the second body 120 from a left side and a right side of the reagent container 100 simultaneously, when the reagent container 100 is put in place.

In the reagent container 100 and the tissue processor according to the embodiment of the present disclosure, the cistern room 124 is provided between the reagent passage 122 and the reagent port 126, and the cistern room 124 has a larger section area than a section area of the reagent passage 122 in the flowing direction towards the reagent port 126, the reagent coming out of the reagent passage 122 will significantly slow down in a short time and will not spill out of the reagent container 100 through the reagent port 126, thereby improving anti-spilling performance of the reagent container 100 during transportation or operation of the reagent container 100.

After the reagent container 100 is pushed into the tissue processor, i.e. the reagent container 100 is put in place on the platform, the detection unit can detect the protrusion 128 of the reagent container 100 and the clamping device can be controlled to clamp the second body 120 from the left side and the right side of the reagent container 100. The reagent port 126 is in communication with the reagent pipeline, such that the reagent can be introduced through the reagent port 126 into a portion of the tissue processor for tissue processing. After completion of the tissue processing, the reagent can be discharged back to the reagent container 100 through the reagent port 126 from the portion of the tissue processor for tissue processing. The air port 134 is in communication with the air pipeline, which is in communication with the ambient air through a filter. Thus, filtered air can be introduced into or discharged out of the reagent container, and the reagent in the reagent container will not be polluted. Furthermore, the reagent container is in communication with the ambient air, thus no vacuum or pressure is formed in the reagent container, avoiding affecting normal flowing of the reagent in the reagent container.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A reagent container for a tissue processor, comprising:
- a first body defining a cavity configured to contain a reagent; and
- a second body attached to a rear face of the first body, the second body defining:
  - a reagent passage in communication with the cavity;
  - a cistern room; and
  - a reagent port;
- wherein the rear face of the first body forms a wall of the reagent passage and the cistern room;
- wherein the cistern room is provided between the reagent passage and the reagent port and in communication with the reagent passage and the reagent port;
- wherein, in a flowing direction towards the reagent port, the cistern room has a larger section area than a section area of the reagent passage;
- wherein the reagent passage comprises a straight segment extending in an up-down direction generally parallel to a straight portion of the rear face of the first body and a bent segment that is angled with respect to the straight portion of the rear face;
- wherein the straight segment of the reagent passage has a lower end in communication with the cavity and an upper end in communication with a lower end of the bent segment;
- wherein an upper end of the bent segment of the reagent passage is in communication with the cistern room; and
- wherein the cistern room includes:
  - a vertical wall that is generally parallel to the straight portion of the rear face of the first body, the vertical wall extending from a lower end to an upper end of the vertical wall;
  - a horizontal wall that is generally perpendicular to the vertical wall, the horizontal wall extending from a rear end to a front end of the horizontal wall, wherein the rear end is connected to the upper end of the vertical wall; and
  - an inclined wall that is connected between the front end of the horizontal wall and the lower end of the vertical wall such that the inclined wall extends upwards from a rear to a front in a direction towards the first body.

2. The reagent container according to claim 1, wherein the cistern room has an increasing section area from bottom to top.

3. The reagent container according to claim 1, wherein the reagent port is arranged above a junction of the reagent passage and the cistern room.

4. The reagent container according to claim 1, wherein the straight segment and the bent segment have an identical section area along a centerline of the reagent passage.

5. The reagent container according to claim 1, wherein the bent segment is bent forward in the direction towards the first body and connected to the cistern room at an intersection of the vertical wall and the inclined wall and tangent to the inclined wall.

6. The reagent container according to claim 1, wherein the reagent port is connected to the vertical wall of the cistern room.

7. The reagent container according to claim 1, wherein the reagent passage has a circular, a square, or a triangular section along a centerline thereof.

8. The reagent container according to claim 1, wherein the cistern room has a circular, a square, or a triangular section along a left-right direction.

9. The reagent container according to claim 1, further comprising:

a third body attached to the first body and defining an air passage and an air port in communication with each other, the air passage being in communication with the cavity.

10. The reagent container according to claim 9, wherein the air passage extends in a front-rear direction, and has a front end in communication with the cavity and a rear end in communication with the air port.

11. The reagent container according to claim 9, wherein the air port is located above the reagent port.

12. The reagent container according to claim 1, wherein the first body is further provided with a filling port.

13. The reagent container according to claim 12, further comprising a cap detachably fitted to the filling port of the first body.

14. A tissue processor, comprising:

a reagent container according to claim 1;

a platform, the reagent container being supported on the platform; and a reagent pipeline in communication with the reagent port of the reagent container.

15. A reagent container for a tissue processor, comprising:

a first body defining a cavity configured to contain a reagent; and a second body attached to a rear face of the first body, the second body defining:

a reagent passage in communication with the cavity;

a cistern room; and a reagent port;

wherein the rear face of the first body forms a wall of the reagent passage and the cistern room;

wherein the cistern room is provided between the reagent passage and the reagent port and in communication with the reagent passage and the reagent port;

wherein, in a flowing direction towards the reagent port, the cistern room has a larger section area than a section area of the reagent passage;

wherein the reagent passage comprises a straight segment extending in an up-down direction generally parallel to a straight portion of the rear face of the first body and a bent segment that is angled with respect to the straight portion of the rear face;

wherein the straight segment of the reagent passage has a lower end in communication with the cavity and an upper end in communication with a lower end of the bent segment; and wherein an upper end of the bent segment of the reagent passage is in communication with the cistern room and the bent segment is bent forward in a direction towards the first body.

16. A reagent container for a tissue processor, comprising:

a first body defining a cavity configured to contain a reagent; and a second body attached to a rear face of the first body, the second body defining:

a reagent passage in communication with the cavity;

a cistern room; and a reagent port;

wherein the rear face of the first body forms a wall of the reagent passage and the cistern room;

wherein the cistern room is provided between the reagent passage and the reagent port and in communication with the reagent passage and the reagent port; and wherein, in a flowing direction from the cavity towards the reagent port, a section area of the cistern room is larger than a section area of the reagent passage and a section area of the reagent port, such that a flow path of the reagent narrows in the reagent passage, widens in the cistern room, and narrows at the reagent port.

17. The reagent container according to claim 16, wherein the reagent passage comprises a first segment extending in an up-down direction and a bent segment that is angled with respect to the up-down direction;

wherein the first segment of the reagent passage has a lower end in communication with the cavity and an upper end in communication with a lower end of the bent segment; and wherein an upper end of the bent segment of the reagent passage is in communication with the cistern room.

18. The reagent container according to claim 16, wherein the reagent passage comprises a straight segment extending in an up-down direction generally parallel to a straight portion of the rear face of the first body and a bent segment that is angled with respect to the straight portion of the rear face;

wherein the straight segment of the reagent passage has a lower end in communication with the cavity and an upper end in communication with a lower end of the bent segment; and wherein an upper end of the bent segment of the reagent passage is in communication with the cistern room.

* * * * *